June 30, 1953     R. J. THOMAS     2,643,529
POWER TRANSMISSION COUPLING
Filed Nov. 27, 1948
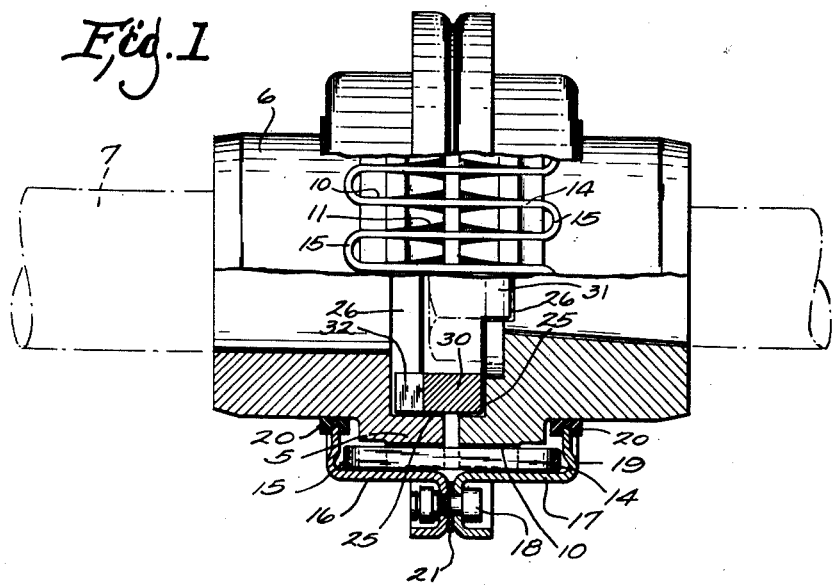
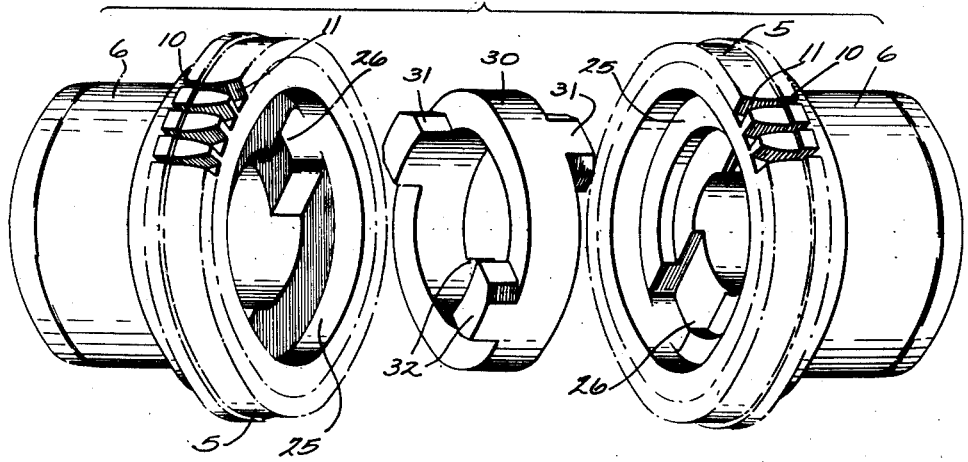
INVENTOR.
RICHARD J. THOMAS
BY
Miles Kensinger
ATTORNEY Patented June 30, 1953

2,643,529

UNITED STATES PATENT OFFICE 2,643,529

POWER TRANSMISSION COUPLING

Richard J. Thomas, Milwaukee, Wis., assignor to The Falk Corporation, Milwaukee, Wis., a corporation of Wisconsin Application November 27, 1948, Serial No. 62,311

5 Claims. (Cl. 64—15)

This invention relates to improvements in power transmission couplings of the torsionally resilient type.

Patent 2,027,842, issued to Schmitter et al. on January 14, 1936, discloses a power transmission coupling in which the two coupling members are torsionally connected by a series of limbs forming a substantially cylindrical member of spring steel strip with the limbs individually engaged in and seated on a wall portion of the peripheral slots in the two coupling members. The limbs are self-adjusting to compensate automatically for misalinement of the axes of the two coupling members are are resilient for flexure upon application of torque to the coupling. The walls of the slots are curved to flare the slot ends which are adjacent one another when the coupling is assembled, and thus provide for increasing seating of the limbs on the slot walls as the limbs flex under increased torque on the coupling. The unsupported length of the several limbs is thus automatically reduced and the torsional stiffness of the coupling is increased as the load thereon increases. At a given value for each coupling, the limbs seat on their respective slot walls for the full length of such walls and any further increase in load places the limbs in shear. Under loads above the given value and particularly at sharply peaked excess loads, the shear stresses may rise to destructive values.

It is, therefore, one object of the present invention to provide a torsionally resilient coupling for power transmission, in which the resilient torque transmitting means is protected from loads above a given value and particularly from peaked loads above such value.

Another object of the invention is to provide a torsionally resilient power transmitting coupling having an element effective for automatically assuming and transmitting that portion of a torque load on the coupling, in excess of the load which may be safely transmitted by the torsionally resilient element of the coupling.

A further object of the invention is to provide a torsionally resilient flexible power transmitting coupling having means for limiting the torsional flexure of the coupling to a desired maximum degree and without impairing flexibility of the coupling.

Other objects and advantages will appear from the following description when read in connection with the drawing in which:

Fig. 1 is a view partially in elevation and partially in section of an assembled coupling on the ends of shafts between which torque is to be transmitted; and Fig. 2 is a perspective view of two similar coupling halves or disk members and of means for joining such coupling halves under given high torque conditions, and indicates the assembled relation of such parts.

The coupling includes a pair of disk members severally comprising a disk portion 5 with hub portions 6 to be fixed on shafts 7. One of the shafts is a driving shaft and the other shaft is a driven shaft, the shafts being as nearly alined as is practicable and thus bringing a face of the several disk portions 5 substantially parallel with one another when the coupling is assembled. The edges or peripheries of the disk portions 5 are slotted to provide an outer slot portion 10 of a width snugly but slidably receiving the limbs of a flexible and resilient member and to provide an inner slot portion 11 formed with divergent or flaring walls. The depth of the slots is such that the resilient member limbs are free to tilt in the slots in planes radial to the disks to compensate for misalinement of the shaft axes.

The resilient member is a flexible strap bent to provide limbs 14 joined by loops 15 and shaped as a whole either as a cylinder or portion of a cylinder dependent on whether the member 14, 15 is made in one or more pieces. The resilient member bears on the smooth interior surface of housing portions 16 and 17 releasably joined by bolts 18 and formed with flanges 19 extending toward the coupling disk hubs 6, the flange edges being provided with lubricant retainers 20 bearing on such hubs. The numeral 21 designates a gasket between the joint portions of the housing. The housing is positioned and is free to adjust itself as is described in the above patent, and the resilient member limbs adjust and position themselves to compensate for misalinement of the shafts as is also described in the above patent, and accordingly not repeated herein.

As the transmitted torque increases, the coupling limbs 14 severally seat on a wall of their respective slots 10, 11 to an increasing extent until finally, at a predetermined loading of the coupling, the full length of each limb is solidly seated on its slot wall. The imposing of an additional load on the coupling then further flexes and eventually puts the resilient member limbs in shear which is likely to break one or more of such limbs particularly when a sharp increase in torque is imposed on the coupling. Such overloading of the resilient member may be prevented if means are provided for otherwise transmitting the torque between the coupling disks when the torque on the coupling exceeds the given value.

Referring particularly to Fig. 2, it will be seen that each disk member 5, 6 is formed with a counter bore or cavity 25 from the faces of the disks to be assembled adjacent one another, each cavity being coaxial with an aperture through a disk hub 6 for receiving a shaft 7. A slot 26 is formed in the bottom of each of the cavities 25, the slot being centered on the axis of the hub. Clearance is provided at the rounded or outer ends of the slots to permit free or floating movement of a supplemental torque transmitting member within the disk cavities as long as the torque imposed on the coupling is below the given value.

The supplemental member has a substantially annular body portion 30 provided with pairs of lugs 31 extending from opposite sides of the supplemental member body. Each pair of lugs 31, 32 is on a diameter of the body and such diameters are at right angles with each other. The lugs are of a height less than the depth of the slots 26 and are of a width less than the width of such slots to avoid torque transmission by the supplemental member, between the coupling disks as long as only a predetermined torque is applied to the coupling, as long as the relative movement between the disk members is below a given value. The edges of the lugs adjacent the periphery of the body portion 30 are chamfered to be engageable in the arcuate slot ends and the lugs have flat sides which are perpendicular with the axis of the disk member.

When the coupling is assembled, the supplemental member 30, 31 floats freely between the coupling disks 5, 6 as long as only a predetermined torque is applied to the coupling. However, the slots 26 and supplemental member lugs 31, 32 are so proportioned that, when the limbs 14 of flexible member seat on the walls of the slots 10, 11 to any desired degree, the supplemental member lugs 31, 32 will engage with the sides of the slots 26. Further increase in the torque imposed on the coupling is then transmitted through the supplemental member rather than through the flexible member limbs and the limbs are thus protected against exposure to any torque above a predetermined or safe maximum.

It will be seen that the two coupling disks may be made identical, thus simplifying manufacture, reducing the stock of spare parts required, and simplifying installation and maintenance of the coupling. The parts are so designed as to be made by the simplest and most easily controlled machining operations and yet with the desired precision. It will be understood that the torque limit may be fixed as desired by proportioning of the parts.

Although but one embodiment of the present invention has been illustrated and described, it will be apparent that various changes and modifications may be made therein without departing from the invention as defined in the appended claims.

I claim:

1. In a power transmission coupling, a pair of peripherally slotted disk members each having an axial aperture therethrough, the disk members severally having a coaxial cavity from one end thereof and having a slot in the bottom of each of the cavities, a flexible torque transmitting member engaging in the disk member peripheral slots and joining the disk members for transmission of torque therebetween below a given value and coacting with the disk members in defining a substantially cylindrical chamber, and a substantially annular member including a body portion and a pair of lugs extending from each of the plane sides of the body, each pair of the lugs being on a diameter of the annular member and the diameters being at right angles with each other, the lugs being shorter and narrower than the depth and the width of the slots from the bottoms of the disk member cavities, the annular member being floatingly retained in the chamber with the lugs severally engageable in the cavity slots only for transmission of torque above the said given value between the disk members.

2. In a power transmission coupling, a pair of driving and driven coupling members each having a cavity coaxial therewith, and slots extending from the cavities, a resilient strip sinuously connecting the edges of the coupling members for transmission of torque therebetween, the strip being movable axially and tiltable radially of the coupling members, and an overload torque transmitting member comprising a body loosely retained in the cavities and lugs extending from the body, the lugs extending in spaced relationship with the sides of the slots and being engaged with the sides of the slots only upon imposition on the resilient strip of a torque above a given value.

3. A power transmission coupling comprising driving and driven coupling members each having a cavity axially therein from adjacent ends of the coupling members and having a slot extending from the cavity, a resilient strip inserted loosely into and looped back and forth between the coupling members, the strip being movable axially and tiltable radially of the coupling members, and an overload torque transmitting member comprising a body smaller than the chamber defined by coaction of the coupling member cavities and pairs of lugs smaller than the slots, the overload member being loosely retained in the chamber with the lugs extending loosely into the slots for engagement of the lugs severally with the sides of the slots only upon imposition on the resilient strip of a torque above a given value.

4. A power transmission coupling comprising driving and driven coupling members each having a cavity axially therein from adjacent ends of the coupling members and having a slot extending from the cavity, the cavities coacting to define a chamber upon assembly of the coupling, the slots extending substantially at right angles to each other upon assembly of the coupling, a resilient strip inserted loosely into and looping back and forth between the coupling members, the strip seating in the coupling members and flexing responsive to torque up to a given value transmitted between the coupling members, the strip being axially movable and radially tiltable relative to the coupling members, and an overload torque transmitting member comprising a body smaller than the chamber defined by the coacting cavities and pairs of lugs smaller than the slots, the overload member being loosely retained in the coacting cavities with the lugs extending in spaced relation into the slots even upon unavoidable misalignment of the coupling members, the sides of the lugs engaging the sides of the slots only upon imposition on the resilient strip of a torque above a given value.

5. In a power transmission coupling, the combination of a driving coupling member and a driven coupling member, each one of the coupling members having a central cavity therein open to the corresponding cavity in the other member and each one of the members having a pair of diametrically disposed recesses from the cavity therein, the pair of recesses in one of the members being disposed substantially at right angles to the recesses in the other member upon assembly of the coupling, a plurality of resilient elements engaged with both of the coupling members for providing an angularly flexible and torsionally resilient torque transmitting connection therebetween, and a member loosely disposed in the cavities and having lugs each projecting loosely into one of the recesses and coacting with the walls thereof to limit the torsional yield of the resilient elements without impairing the angular flexibility thereof.

RICHARD J. THOMAS.

References Cited in the file of this patent

UNITED STATES PATENTS

| Number | Name | Date |
|---|---|---|
| 1,171,347 | Morse | Feb. 8, 1916 |
| 2,158,847 | Baumann | May 16, 1939 |
| 2,171,999 | Weiland | Sept. 5, 1939 |
| 2,181,537 | Schmitter | Nov. 28, 1939 |